A. FOLLET.
Bog-Cutter.
No. 6,802.
Patented Oct. 16, 1849.
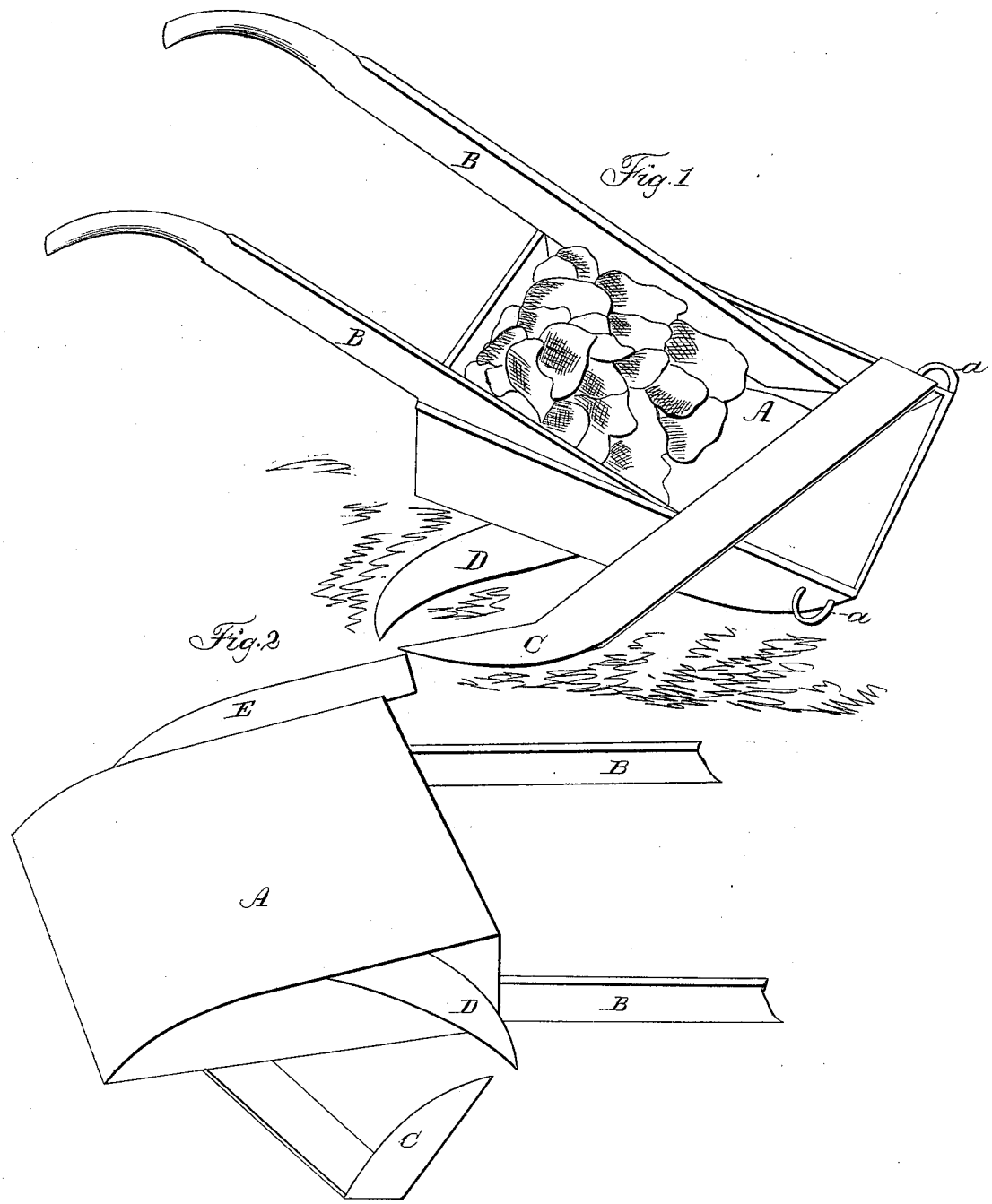

UNITED STATES PATENT OFFICE.

ABNER FOLLET, OF WINDHAM, CONNECTICUT.

IMPROVEMENT IN BOG-CUTTING MACHINES.

Specification forming part of Letters Patent No. 6,802, dated October 16, 1849.

*To all whom it may concern:*

Be it known that I, ABNER FOLLET, of Windham, in the county of Windham and State of Connecticut, have invented a new and useful machine for cutting off the bogs or hummocks from the surface of meadows or swamps whose surface is sufficiently hard to admit of driving horses or cattle over them; and I hereby declare the following to be a full, clear, and exact description of the manner of constructing and using the same, reference being had to the annexed drawings of the same, making part of this specification, in which—

Figures 1 and 2 are perspective views of the machine, seen on its upper side and in an in-inverted position respectively.

The same letters refer to the same parts in all the figures.

In the accompanying drawings, A represents the body of the machine, which may be made of cast-iron, wood, or other suitable material, and can be filled with stones or other substance sufficiently heavy to keep it steady and hold the guide-cutter E in the ground. This body in form somewhat resembles a scraper, is drawn in the same manner by chains attached to the eyes $a$, placed near the front end of its sides, and is guided by means of the handles B.

C is a vertical cutter or colter, which cuts vertically through the bog or hummock in the line of its motion in the same manner as the colter of a plow divides the slice from the land.

D is a horizontal cutter or lay, which follows the colter, shaving off even with the surface of the ground that part of the hummock divided by the colter and between it and the side of the body.

E is a guide-cutter, which projects downward from the bottom of the body of the apparatus parallel to its length, cutting into the soft sod and holding the share and colter up to the work. It acts in a manner analogous to the operation of the keel of a boat, counteracting any tendency to deviate from its course.

The colter C, share D, and guide E, I prefer to make of iron edged with steel, which should be kept sharp to operate well. The several parts of the apparatus should be well secured together by means of screws or otherwise, and the angles of the body, if it is made of boards, should be iron bound.

The operation of the machine is as follows: Horses or oxen being harnessed to it, it is drawn in the manner of a plow alternately in opposite directions and in parallel lines across the bog, and it is plain that the colter and share must shave off the tufts, bogs, and all small protuberances over which it passes, leaving a smooth and level surface. The pieces of bog shaved off are thrown into a cart or other vehicle and drawn off the ground.

I have found it best to begin to clear a piece of ground by driving through its middle and working out to either side.

What I claim as my invention, and desire to secure by Letters Patent, is—

The box or sledge provided with horizontal and vertical knives, which project from its side, for cutting off the hummocks or tufts, the whole being made and arranged as herein set forth.

In testimony whereof I have hereunto set my hand this 11th day of April, A. D. 1849.

ABNER FOLLET.

Witnesses:
THOMAS GRAY,
GEORGE FOLLET.